Patented June 2, 1936

2,042,486

UNITED STATES PATENT OFFICE 2,042,486

PLASTIC FOR LAMINATED SAFETY GLASS

Joseph D. Ryan and George B. Watkins, Toledo, Ohio, assignors to Libbey-Owens-Ford Glass Company, Toledo, Ohio, a corporation of Ohio No Drawing. Application August 27, 1934, Serial No. 741,729

13 Claims. (Cl. 49—81)

The present invention relates to laminated safety glass and more particularly to improvements in plastics so that they can be bonded or joined directly to glass surfaces without the interposition of adhesives or other bonding materials between the glass and plastic layers.

Laminated safety glass is a composited structure ordinarily composed of two sheets of glass and an interposed layer of tough, transparent plastic material adherent to the inner surfaces thereof. It has been the general practice to coat either the inner surfaces of the glass sheets, both surfaces of the plastic layer, or the surfaces of both the glass and plastic with some suitable adhesive or other bonding medium prior to arrangement of the laminations in sandwich form. After assembly, the sandwich so formed has been subjected to the combined action of heat and pressure to get the necessary bond between the laminations.

It has been customary to employ cellulose derivative plastics as the intermediate layer in the commercial production of laminated safety glass and, in addition, some attempts have been made to commercialize the use of synthetic resins for this purpose. Laminated safety glass has found wide use in vehicles, so that in normal use the glass is subjected alternately to summer's heat and winter's cold, and to be commercially satisfactory the bond between the laminations must not be noticeably adversely affected by change in temperature over a period of years.

One of the main difficulties encountered in the art is the obtaining of a satisfactory bond between the plastic layer and glass surfaces, with the permanency and quality of bond being independent of temperature. Numerous cellulose derivative plastics possess sufficient strength, clarity, and stability to heat and light energy as to be satisfactorily usable as the intermediate layer provided, however, that such plastics can be properly and permanently bonded to the glass sheets.

The objections to using a process where it is necessary to employ adhesive coatings will be readily appreciated when it is pointed out that when using the adhesive coatings, the danger of introducing dirt and other foreign matter between the laminations is considerable. Furthermore, there is always the possibility that the adhesive will lack the necessary adhesiveness toward the glass and/or toward the plastic layer to be cemented between the glass. This is all in addition to the question of cost of preparing and applying the adhesive material to the laminations.

It is the main object of the present invention to provide a plastic which can be bonded directly to glass surfaces without requiring the use of independent adhesive layers or other bond inducing means. More specifically, the invention embodies the idea of making a type of plastic normally lacking in adherence toward glass surfaces in such a way that it will have the new property of adherence toward glass when pressed thereagainst, preferably in the presence of heat, without the use of any extraneous or independent coatings of adhesive material.

Heretofore, in producing plastics for laminated safety glass, the plastic has been ordinarily made by either plasticizing cellulose derivatives or synthetic resins with the proper amount and kind of plasticizer and after making of the plastic layer in this way to bond it to glass by the application of a selected type of adhesive material. Obviously, the necessity for using the adhesive coating has been because of the lack of adherence of the plastic layer itself toward glass surfaces even in the presence of heat and pressure treatment.

When stating that such plastics are not adherent to glass surfaces, it is not necessarily meant that there is a total absence of adherent characteristics, although this may be true in many cases, but rather it is meant that it is impossible to bond the plastic and glass surfaces together to produce laminated safety glass suitable for commercial use. The bond required is such that the laminations will not separate in whole or in part for a period of years when subjected to the normal temperature conditions ordinarily encountered in use. To be satisfactory, laminated glass must be such that when the glass sheets are broken as by an impact, the fragments so formed will remain adherent to the plastic layer and this whether the glass is broken at elevated temperatures, for example 100° F., or at the lower temperatures, for example, 0° F.

Basically, our invention consists in so preparing the transparent plastic material, whether it be a cellulose derivative plastic or a resin plastic, by either subjecting all or a portion of the unplasticized base material (cellulose derivative or resin) to a rather severe chemical treatment, then making it into a plastic mass by the addition of proper amounts of plasticizer. The chemical treatment so changes the characteristics of the base material used in preparing the plastic that the resulting plastic will have adherent properties towards glass and can be made adherent thereto merely by the application of heat and pressure without the use of adhesives or other bonding mediums.

We have discovered as a result of innumerable experiments with various types of cellulose derivative plastics and synthetic resin plastics that we can change the characteristics of a plastic material normally lacking in adherence toward glass surfaces by chemically treating part or all of the base material used in producing the plastic in such a way as to increase the polar groups of the base material, subsequently plasticizing the treated base material, and forming a sheet or layer therefrom which will possess the property of adherence toward glass. Stated broadly, we have discovered that by increasing the polar groups of a base material used in producing a cellulose derivative plastic, synthetic resin plastic, or mixture of the two, that the plastic produced therefrom can be bonded directly to glass surfaces merely by the application of heat and pressure.

As will be appreciated from the examples to follow, the chemical treatments suggested increase the polar groups of the base materials used in making the plastics and we believe it depends upon the particular chemical treatment employed as to whether the polar groups are increased during the chemical treatment as a result of hydrolysis, a result of oxidation, or as a result of a combination of both oxidation and hydrolysis. Our invention is not specific to any one particular way of chemically treating the base materials. Rather, the invention relates broadly to any treatment of the base material whereby the polar groups of the base material are increased sufficiently that the resulting plastic made from the chemically treated base material has adherent properties toward glass. Naturally, the amount of polar group increase required will depend upon the particular plastic to be formed. However, it can be readily determined when the polar group increase is sufficient by making sample layers or sheets of plastic and pressing them between glass sheets in the presence of heat. If an adequate bond is not obtained, the polar group increase has been insufficient and further treatment of the unplasticized base material is required.

In general, the polar groups that are increased or even added to the base material are the carboxyl group; hydroxyl group; aldehyde group; and keto group.

For example, in the manufacture of our improved plastic material using certain cellulose esters as the base, such as cellulose acetate, cellulose aceto butyrate, cellulose propionate, etc., we have increased the polar groups by subjecting from 25% to 50% of the base material used in making the plastic to a hydrolytic treatment by subjecting the raw cellulose derivatives to the prolonged action of various water solutions of acids and alkalies. It may be mentioned that oxidizing agents can also be used and if they are we believe that oxidation takes place as well as hydrolysis.

In the manufacture of other types of plastics suitable for direct bonding to glass surfaces without the use of adhesive layers using, for example, some of the other cellulose derivatives such as the cellulose ethers including ethyl cellulose, benzyl cellulose, propyl cellulose, etc., we have found that the polar groups in a portion or all of the base material can be effectively increased by subjecting said material before plasticization to a treatment which is essentially oxidizing in character, As an example of a chemical treatment designed to increase the polar groups by oxidation, ethyl cellulose plastic can be produced for direct bonding to glass. A quantity of unplasticized ethyl cellulose which oftentimes, when purchased on the open market, is dense and non-porous in character, is first preferably rendered porous and fluffy by dissolving the dense, horny particles in acetone and the resulting dope slowly poured with rapid stirring into a large volume of water, which mixture is then filtered and the porous mass on the filter washed with water and dried. The reason for treating the dense, non-porous unplasticized ethyl cellulose in this way is to cut down the time required for carrying on the chemical treatment, namely, the oxidizing treatment, to increase the polar groups of the material.

Numerous oxidizing agents are suitable for producing the desired results and such materials as bleaching powder, chlorine, bromine, dilute nitric acid, potassium chlorate and hydrochloric acid, chromic acid, sodium hydroxide and air, potassium or sodium dichromate and sulfuric acid, as well as potassium permanganate, may be successfully employed. Naturally, the reaction time, temperature, and concentration of reactants are varied or are dependent upon the power of the oxidizing agent selected as well as particular ethyl cellulose to be oxidized.

One formula that can be used in the oxidation of the ethyl cellulose comprises employment of potassium permanganate. The proportions of 10 grams of ethyl cellulose suspended in a solution of 5 grams of potassium permanganate dissolved in 500 c. c. of water can be used. The mixture may then be heated by a steam bath until the purple permanganate color has been replaced by the brownish color characteristic of manganese dioxide. Ordinarily, several hours are required for the reaction to take place and after completion of the reaction, the mixture can be treated in several ways to recover the oxidized ethyl ether of cellulose. In one method of recovery, the reaction mass may be filtered, air dried, and extracted with a suitable solvent for the oxidized ethyl cellulose which is a non-solvent for manganese dioxide.

This chemical treatment of the base material (the unplasticized ethyl cellulose) increases its polar groups by oxidation. We believe, however, that this treatment not only increases the polar groups of the base material by oxidation but that undoubtedly hydrolysis also plays an important part in view of the fact that when cellulose derivatives are subjected to water solutions at elevated temperatures, they undergo a certain hydrolytic action.

In producing a plastic layer with the chemically treated base material, the treated base material may be mixed with other base material not so treated and the mass then plasticized in the manner well known in the art. The percentage of treated base material with respect to untreated base material may be varied and in fact in some plastics it may be preferred to chemically treat all of the base material to increase the polar groups thereof. The requirement for any of the plastics produced in accordance with this invention is that a sufficient amount of the chemically treated base material is included to render the plastic mass formed adherent to glass surfaces upon the application of heat and pressure in the absence of any adhesive or other bond promoting layers.

As an example of treating the base material primarily by hydrolysis, cellulose acetate can be reacted with a mixture of acids in the approximate proportions of 50 parts of cellulose acetate in 834 parts of water together with 7 parts of concentrated C. P. hydrochloric acid and 11 parts of 75% orthophosphoric acid. Such a mixture should be heated and allowed to react while being rapidly agitated at a temperature of about 195 to 208 degrees Fahrenheit for a period of approximately two hours.

The reaction product thus formed is then washed substantially free from the acid solution and dried in an oven at a temperature of approximately 200 to 212 degrees Fahrenheit for about fifteen hours.

As in the case of the ethyl cellulose and in fact in the case of all cellulosic derivatives, the reaction product may then be added with other base material not so treated and the entire mass plasticized as is well understood in the art. The same plasticizer can be used as when the base material is not chemically treated.

In addition to the cellulose derivative plastic, direct bonding plastics can be made of synthetic resins. We have been able to effect the same bonding characteristics by subjecting the resinous base material either in part or in whole before plasticization to rather severe chemical treatment. Here again in just the same way as with the cellulose derivatives, it depends upon the type of resin material used as the base material as to just the exact chemical reaction required to bring about the necessary increase of polar groups.

We have found, for example, that the resins of the acrylic acid ester type can be prepared by subjecting the acrylic acid resin base to a prolonged hydrolytic action employing mineral acids in the proper concentration. Similarly, this same general type of reaction is used to produce the desired results in the case of the vinyl ester resins.

A resin plastic formed from a co-polymerized mixture of vinyl acetate and vinyl chloride can be made as a self-bonding layer by dissolving all or a portion of the base material in commercial acetone to facilitate chemical reaction. To this solution may be added a mixture of concentrated hydrochloric acid diluted with commercial acetone, after which the entire mixture may be refluxed on a steam bath. After the reaction period, the mixture is cooled and poured into water while being vigorously stirred. Under such circumstances, the resin precipitates, and it may then be washed free of acid and dried. Plasticization of the chemically treated resinous mass can be accomplished with suitable solvents and plasticizers and as in the case of the cellulose derivatives, all of the base material can be chemically treated to increase its polar groups or only a portion treated.

In addition to the making of straight cellulose derivative plastics and straight synthetic resin plastics, mixtures can be made and in some cases mixed cellulose derivative and resin plastics are desirable because the cellulose derivative ordinarily adds strength to the resinous material while the resinous material as a rule tends to waterproof the mix and to increase the rubbery-like characteristics of the plastic.

Based upon the many plastics produced and tried as exemplified above, we are of the opinion that all types of plastics, either of cellulose derivative or the resin type, normally lacking in adherent ability toward glass can be made into a plastic suitable for direct bonding to glass surfaces by subjecting all or a part of the unplasticized base material to a proper chemical treatment to increase its polar groups, thereby giving a plastic when suitably plasticized which can be bonded directly to glass upon the application of heat and pressure and without the application of any adhesive. Every plastic we have made in this way to date has been outstandingly successful.

As previously stated, the amount of chemically treated base material required in any given plastic will depend upon the particular plastic. In those cases where it is desired to use some untreated and some treated base material, it is necessary that the chemical treatment be not carried so far that the treated base material becomes incompatible with the untreated base material. In other words, under such circumstances, the base material cannot be completely hydrolyzed or completely oxidized and still remain compatible with untreated base material.

The examples set forth above are by way of illustration only to show some of the various types of treatment that can be used to increase the polar groups of the base materials used in the making of the plastics. The list of examples is not intended to be complete as those versed in the art of plastic manufacture will, with the above, be able to select for any given plastic a satisfactory method of chemical treatment to increase the polar groups and, as stated above, we have found that it is this increase of the polar groups that changes a non-adherent type of plastic to an adherent type of plastic. It will likewise be understood that the chemical treatment of the base material is done before plasticization. After the chemical treatment, the base material may be plasticized in accordance with the various practices in the art for plasticizing cellulose derivatives and synthetic resins.

While the many advantages to be gained by the use of a plastic mass capable of being bonded directly to glass surfaces are believed to be apparent, it may be noted that such a type of plastic is of utmost importance where the plastic is to be extruded or forced between a pair of glass plates instead of using a preformed sheet or layer of material. In those cases where the glass sheets are placed in spaced relation and a plastic mass formed therebetween, it is impractical to use a plastic requiring adhesives upon the surface of the glass because, even though the glass sheets be coated with an adhesive, the forcing of the plastic material between the coated glass sheets will disrupt the adhesive layer, if not completely destroy it.

We claim:
1. Laminated safety glass comprising two sheets of glass and an interposed layer of transparent plastic adherent directly to the inner surfaces thereof, a portion at least of the base material of said plastic having been chemically treated prior to plasticization to increase its polar groups sufficiently to give a direct bonding plastic toward glass.

2. Laminated safety glass comprising two sheets of glass and an interposed layer of a type of transparent plastic, normally lacking in adherence toward glass, bonded directly to the inner surfaces of the glass sheets, a portion at least of the base material of said plastic having been chemically treated prior to plasticization to increase its polar groups sufficiently so that when plasticized the plastic produced therefrom can be bonded directly to the glass sheets upon the application of heat and pressure.

3. Laminated safety glass comprising two sheets of glass and an interposed layer of a type of transparent cellulose derivative plastic, normally lacking in adherence toward glass, bonded directly to the inner surfaces of the glass sheets, a portion at least of the base material of the cellulose derivative plastic being chemically treated prior to plasticization to increase its polar groups sufficiently so that when plasticized the plastic produced therefrom can be bonded directly to the glass sheets upon the application of heat and pressure.

4. Laminated safety glass comprising two sheets of glass and an interposed layer of a type of transparent synthetic resin plastic, normally lacking in adherence toward glass, bonded directly to the inner surfaces of the glass sheets, a portion at least of the base material of the synthetic resin plastic being chemically treated prior to plasticization to increase its polar groups sufficiently so that when plasticized the plastic produced therefrom can be bonded directly to the glass sheets upon the application of heat and pressure.

5. Laminated safety glass comprising two sheets of glass and an interposed layer of a type of transparent plastic, normally lacking in adherence toward glass, bonded directly to the inner surfaces of the glass sheets, a portion at least of the base material of said plastic having been partially hydrolyzed to increase its polar groups sufficiently so that when plasticized the plastic produced therefrom can be bonded directly to the glass sheets upon the application of heat and pressure.

6. Laminated safety glass comprising two sheets of glass and an interposed layer of a type of transparent plastic, normally lacking in adherence toward glass, bonded directly to the inner surfaces of the glass sheets, a portion at least of the base material of said plastic having been partially oxidized to increase its polar groups sufficiently so that when plasticized the plastic produced therefrom can be bonded directly to the glass sheets upon the application of heat and pressure.

7. Laminated safety glass comprising two sheets of glass and an interposed layer of a type of transparent plastic, normally lacking in adherence toward glass, bonded directly to the inner surfaces of the glass sheets, a portion at least of the base material of said plastic having been chemically treated prior to plasticization to increase its polar groups by hydrolysis and oxidation sufficiently so that when plasticized the plastic produced therefrom can be bonded directly to the glass sheets upon the application of heat and pressure.

8. The process of producing laminated safety glass comprising two sheets of glass and an interposed layer of transparent plastic of a type normally lacking in adherence toward glass, consisting in chemically treating at least a portion of the base material of said plastic before plasticization thereof to increase its polar groups and then, after plasticization thereof, placing the plastic between the glass sheets and bonding the same directly to the inner surfaces of the glass sheets by the application of heat and pressure.

9. The process of producing laminated safety glass comprising two sheets of glass and an interposed layer of transparent plastic of a type normally lacking in adherence toward glass, consisting in subjecting at least a portion of the base material of said plastic before plasticization thereof to a hydrolytic action to increase its polar groups and then, after plasticization thereof, placing the plastic between the glass sheets and bonding the same directly to the inner surfaces of the glass sheets by the application of heat and pressure.

10. The process of producing laminated safety glass comprising two sheets of glass and an interposed layer of transparent plastic of a type normally lacking in adherence toward glass, consisting in subjecting at least a portion of the base material of said plastic before plasticization thereof to an oxidizing treatment to increase its polar groups and then, after plasticization thereof, placing the plastic between the glass sheets and bonding the same directly to the inner surfaces of the glass sheets by the application of heat and pressure.

11. The process of producing laminated safety glass comprising two sheets of glass and an interposed layer of transparent plastic of a type normally lacking in adherence toward glass, consisting in subjecting at least a portion of the base material of said plastic before plasticization thereof to a combined hydrolyzing and oxidizing treatment to increase its polar groups and then, after plasticization thereof, placing the plastic between the glass sheets and bonding the same directly to the inner surfaces of the glass sheets by the application of heat and pressure.

12. The process of producing laminated safety glass comprising two sheets of glass and an interposed layer of transparent cellulose derivative plastic of a type normally lacking in adherence toward glass, consisting in chemically treating at least a portion of the base material of said cellulose derivative plastic before plasticization thereof to increase its polar groups and then, after plasticization thereof, placing the plastic between the glass sheets and bonding the same directly to the inner surfaces of the glass sheets by the application of heat and pressure.

13. The process of producing laminated safety glass comprising two sheets of glass and an interposed layer of synthetic resin plastic of a type normally lacking in adherence toward glass, consisting in chemically treating at least a portion of the base material of said synthetic resin plastic before plasticization thereof to increase its polar groups and then, after plasticization thereof, placing the plastic between the glass sheets and bonding the same directly to the inner surfaces of the glass sheets by the application of heat and pressure.

JOSEPH D. RYAN.
GEORGE B. WATKINS.